United States Patent Office 3,397,514
Patented Aug. 20, 1968

3,397,514
AIR FILTER
Otto Rothfeld, 862 Calle Roberto Espinoza, and Benno
Dasch La Verbena 5040–D, both of Santiago de Chile,
Chile
Continuation-in-part of application Ser. No. 387,869,
Aug. 6, 1964. This application Sept. 13, 1966, Ser.
No. 579,065
8 Claims. (Cl. 55—233)

ABSTRACT OF THE DISCLOSURE

In an air filter, air is passed through concentric filter cylinders which are supported in an oil bath and alternately perforated at their upper and lower portions. The cleaned air impinges against a cover plate so as to be separated from entrained oil which is returned to the oil bath.

---

This application is a continuation-in-part of our application Ser. No. 387,869, filed Aug. 6, 1964, now abandoned.

This invention relates to air filters or cleaners of the oil bath type, particularly to air filters used to clean the air supplied to the carburetor of an internal combustion engine.

Oil bath filters for the removal of dust from the air used for the carburetion systems of internal combustion engines have been known and used for a long time. However, it has been difficult to obtain complete dust removal without charging the air with fine oil droplets. This requires additional use of filter devices removing the oil, which increase the space required for the filter unit and the resistance to the air flow and which often require frequent cleaning or exchanges.

It is a principal object of the invention to provide an oil bath air filter which is compact, maintains its efficiency over long periods of time, and prevents entraining of oil with the cleaned air stream.

Other objects and advantages will be apparent from a consideration of the specification and claims.

According to the invention, vertical spaced concentric cylindrical filter means are provided which extend with their lower ends into an oil bath disposed at the bottom of the unit. The cylindrical filters comprise alternately an upper solid and a lower perforated part, and a lower solid and an upper perforated part; in this way, the air is forced to pass completely vertically along the annular passages formed by the subsequent cylinders and moistens thereby the whole filter surface with oil taken up from the oil bath. The solid wall part of each cylinder collects solid impurities in contact of the air with its wet surface while the perforated part allows the air to pass through. Due to the alternating arrangement of solid and perforated parts, the air passing through a perforated part of one cylinder impinges upon the moist solid part of the next cylinder.

The perforations of the perforated parts of the cylinder walls preferably have a size which permits formation of an oil film covering the apertures so that the air has to pass through said oil film to enter the next annular space between the cylinders. Conventional wire mesh is perfect for this purpose.

In order to improve the separation of solid particles on the solid parts of the cylinder walls, said parts are preferably covered with any material suitable to increase the adsorption of such particles. Said adsorbed or adhered particles are continuously washed down by the oil raised and circulated by the air flow and collect in the oil reservoir at the bottom of the unit.

After leaving the last filter cylinder, the air is passed upwardly against a disc where any entrained oil is kept back and returned to the oil bath.

For special applications, for instance for machines operated in a very dusty atmosphere means, e.g. a turbine, may be provided to increase the circulation of the oil.

Illustrative embodiments of the invention are shown in the accompanying drawing, in which FIG. 1 is a vertical cross sectional view of an oil bath air filter according to the invention;

Like reference numerals have been used to designate like parts in the drawings.

Figure 2:
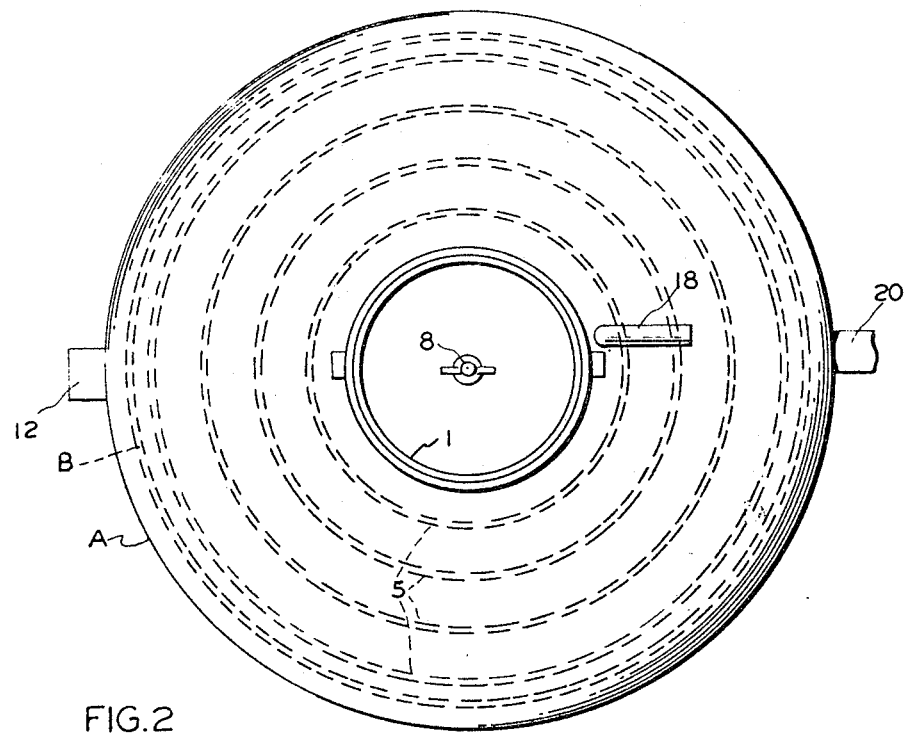
FIG. 2 is a top elevational view of the same.

Referring to the drawing, the filter comprises an upper part A forming a cover 2 for the lower part B containing at its bottom the oil bath. A conduit 1 for the purified air connects the upper part A with the carburetor. A perforated false bottom 7 is provided inside the oil bath to allow setting of the solid impurities in the sump S of the oil bath below said false bottom.

Cylindrical concentric filter plates 5 are soldered or otherwise secured to cover plate 19 which, in turn, supports in suitable manner the upper part A. In the shown embodiments, the rim of cover plate 19 and the lower end of part A are bent together outwardly to form a bead. Any other form of detachable or fixed assemblage may be used, depending on whether or not it is desired to apply the part A together with the filter plates as a unitary structure, supported by the filter plates on the false bottom 7.

The filter plates 5 may be of metal, plastic, or any other suitable oil resistant material and comprise a perforated portion, for instance a wire mesh screen 6, at one end and a solid part at the other end, whereby said wire mesh screens form in successive cylinders alternately the upper and lower portion. Preferably, the oil bath covers the filter elements up to about one third of the height of the lower perforated portion of the filter plates. At the outer side, the solid portion may be covered with a textile fabric, sponge material, bristles or any other oil resistant material 13 suitable to retain on impact with the air to be cleaned the solid impurities contained therein.

The free air space in the center of the filter unit is covered by a concave or preferably conical disc 3 supported on a bolt secured to the bottom of the unit by means of a wing nut 8, washer 15, and gasket 16. The angle of the cone should be wide, not only to save space but also to assist the deflection of the impinging air to the outer rim and to an area where the entrained oil droplets do not fall back in the free center space but flow to the rim for drainage.

The oil entrained with the air is separated at the baffle 3, collects in a channel formed by the downwardly bent rim and is returned by several drain pipes 4 into the inside of the filter and directed against the upper solid wall of at least one of the filter cylinders, thus moistening and washing the surface thereof. Other drain pipes 11 return the oil collecting on the plate 19, preferably directly to the inner air space so that the suction produced by the operation of the engine in said space assists the circulation of the oil.

A turbine 17 may be provided in certain cases to reinforce further the oil circulation whereby the turbine blades 9 may be disposed as shown or may turn in a horizontal plane. The turbine may be driven by gases supplied through line 18 from the valve casing, or any other means.

A flange 20 may be provided to form a connection to the exhaust in case that it is desired to pass part of the exhaust gases through the filter, and flange 12 serves to allow introduction of gases from the valve chamber into the filter unit.

Figure 1:
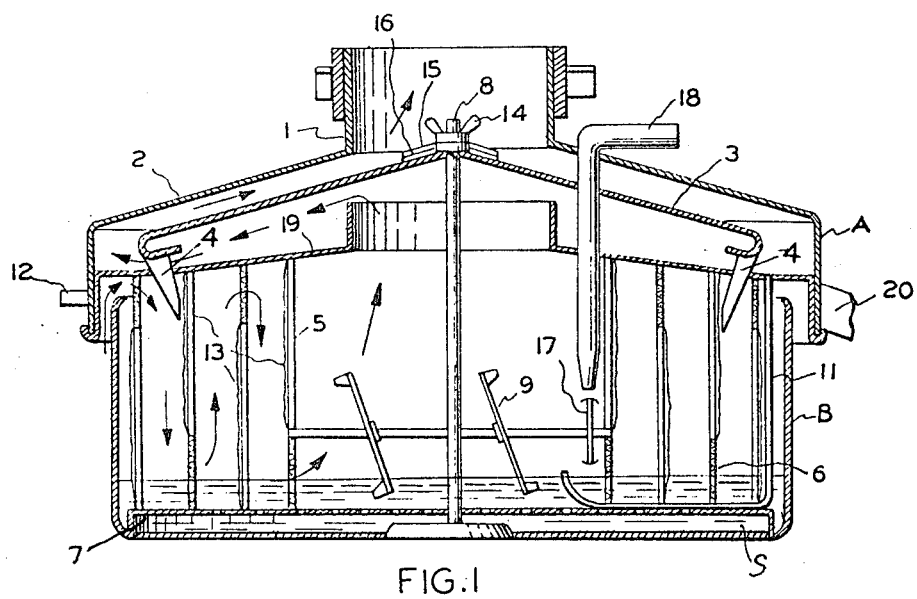
Figure 4:
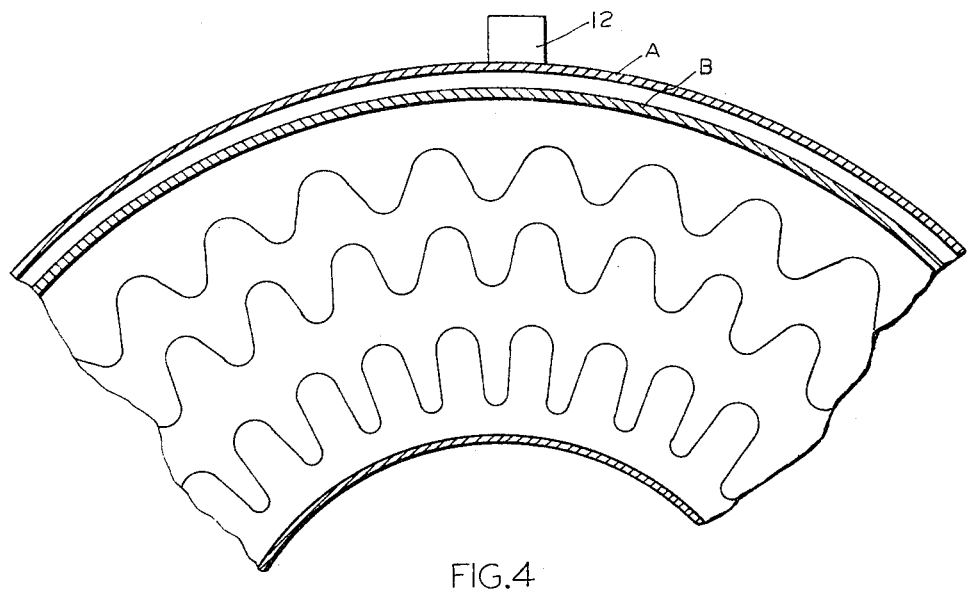
FIG. 4 is a partial top elevational view of the filter of FIG. 3.
Figure 3:
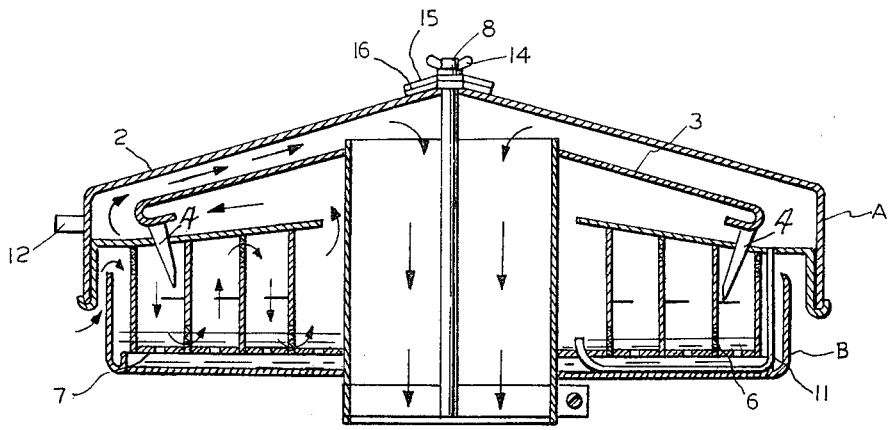
FIG. 3 is a vertical sectional view of another embodiment of the invention.

The embodiment shown in FIGS. 3 and 4 is similar to that of FIGS. 1 and 2 but designed in a more compact form so as to be suitable to be placed directly on the carburetor. For this purpose, the conical disc cover 3 has in its center an aperture to receive a tubular member 21 which is secured to the carburetor and through which the purified gases pass downwardly into the carburetor. Said gases have given off any entrained oil by impact against the disc 3 and on their passage through the space between said disc 3 and cover 2.

In this embodiment, the filter cylinders have crimped or fluted walls, as shown in FIG. 4, to increase the filter surfaces.

In operation, the suction of the carburetor draws in air which is passed through the filter in the direction of the arrows. As will be seen, the air passes first through the screen in the upper part of the outermost cylinder, from where it is directed against the dust adsorbing unperforated part of the second cylinder. The air then makes a bend, passes downwardly between the outermost and next cylinder; thereafter the air passes through the oil film covered perforations of said next cylinder and travels again upwardly. The up and down travel continues until the cleaned air passes through the perforations at the lower part of the last cylinder into the center cylindrical or annular air space and travels upwardly to impinge on the disc 3 and is forced around the outer rim of said disc. Due to the impact of the air against the disc, any entrained oil droplets separate out and collect in the inwardly bent rim from which they are directed by a suitable number of drain pipes against at least one of the cylinders and assist in moistening the surface and washing down the impurities.

As the surface of the screen in the outermost cylinder is larger than the perforated parts of the inner cylinders, said part in the outermost cylinder, which receives the entering air, may be shorter than the screen parts of the other cylinders. Generally, it was found that the level of the oil bath should be such as to cover, in inoperative conditions of the engine, about one third of the height of the perforated part of the cylinders.

The draft produced by the operation of the engine, in combination with the movements of the vehicle ensures a continuous oil circulation sufficient for simultaneous moistening and washing of the filter surfaces. In this way, the collected solid impurities do not clog the apparatus but are washed down continuously into the oil sump, where they are prevented from reentering the filter part of the apparatus by the false bottom. The new filter does not require any exchangeable filter elements and it is sufficient to change the oil and to wash the lower parts of the unit at relatively long intervals.

An essential part of the invention is formed by the disc 3 which has the double function of freeing the purified gas from the oil by reversing the direction of the impinging gas, and to make use of the separated oil for cleaning the filter walls. In the shown embodiments, the precipitated oil is directed only against those filter cylinders having the unperforated section at their upper end. It is, of course, possible to arrange drain pipes from the collecting rim of the discs 3 to those filter cylinders where the unperforated section is in the lower part and dips into the oil bath. However, for the latter filter surfaces, rinsing with the collected oil is less important because, generally, the oil bath will be sufficiently shaken by the car motion to clean the lower portions of the filter walls.

It will be understood that some changes may be made in the embodiment of this invention without departing from the spirit thereof. For instance, the cylindrical filter plates may be combined with the disc baffle to a rotatable unit and drive means, for instance, a small electromotor, may be provided to rotate this subunit during operation, and the concentric filters may have another than cylindrical form to conform to special space requirements.

We claim:

1. An air filter for internal combustion engines comprising a housing having a bottom, a top, side walls, and an inlet and an outlet for air, an oil bath at the bottom of said housing, a perforated false bottom inside said oil bath, vertical spaced concentric filter elements supported on said false bottom and extending upwardly from said oil bath into the path of the air between said inlet and outlet, a cover plate at the top of said filter elements and forming a unit with said filter elements and false bottom, each of said filter elements comprising a solid portion and a perforated portion, said perforated portion forming alternately the upper and the lower portion of successive filter elements, the innermost of said elements together with said false bottom and said cover plate defining an air chamber communicating with said outlet, a disc at the top of said housing having a downwardly and outwardly inclined lower surface impinged by the filtered outflowing air and extending outwardly at least over the innermost filter element, the outer rim of said disc being bent to form a channel collecting oil deposited by the impinging air, said disc and top of the housing defining between themselves a passage for the filtered air to the air outlet and means directing at least part of the collected oil to the oil bath along the solid portion of at least one of said filter elements, thereby cleaning said elements.

2. An air filter as claimed in claim 1, wherein said filter elements enter into the oil bath and are supported on said false bottom.

3. An air filter as claimed in claim 2, wherein said oil bath covers said filter elements up to about one-third of the height of the lower perforated portions.

4. An air filter as claimed in claim 1, wherein said means returning the collected oil are drain pipes, directing the oil against the upper solid part of a filter element.

5. An air filter as claimed in claim 1, wherein the perforations of the perforated portions of the filter elements have a size permitting formation of an oil film closing the perforation.

6. An air filter as claimed in claim 1 including turbine blades disposed in said air chamber and means driving said blades.

7. An air filter as claimed in claim 1, wherein said filter elements are fluted cylinders.

8. An air filter as claimed in claim 1 comprising means returning oil deposited by the outflowing gases on said cover plate to the oil bath.

References Cited

UNITED STATES PATENTS

| | | | |
|---|---|---|---|
| 942,503 | 12/1909 | Jacobs | 55—404 X |
| 1,069,335 | 8/1913 | Johnson. | |
| 1,670,660 | 5/1928 | Haase et al. | 55—246 X |
| 1,855,722 | 4/1932 | Metz | 55—220 X |
| 2,190,886 | 2/1940 | Schaaf et al. | 55—521 X |
| 3,115,459 | 12/1963 | Giesse. | |
| 3,220,167 | 11/1965 | Van Der Ster et al. | 55—521 X |

FOREIGN PATENTS

| | | |
|---|---|---|
| 123,499 | 2/1947 | Australia. |
| 867,820 | 11/1941 | France. |
| 880,018 | 3/1943 | France. |
| 316,594 | 12/1919 | Germany. |
| 21,243 | 11/1900 | Great Britain. |

HARRY B. THORNTON, *Primary Examiner.*

S. W. SOKOLOFF, *Assistant Examiner.*